United States Patent Office 3,476,826
Patented Nov. 4, 1969

3,476,826
ORGANO-SILANE MODIFIED POLYSULFIDE POLYMERS AS ADHESIVE ADDITIVES OR PRIMERS FOR HIGH RANK POLYSULFIDE BASED ADHESIVE COMPOSITIONS
Edward G. Millen, Princeton, N.J., assignor to Thiokol Chemical Corporation, Bristol, Pa., a corporation of Delaware
No Drawing. Filed May 23, 1966, Ser. No. 551,960
Int. Cl. C08g *43/02, 47/10*
U.S. Cl. 260—824         18 Claims

ABSTRACT OF THE DISCLOSURE

Polysulfide polymers having pendant organo-silane radicals containing hydrolyzable groups are effective as adhesion additives or primers for high rank polysulfide polymer compositions used as sealants or bonding agents on various substrates such as glass and aluminum.

This invention relates to improved high sulfur rank liquid polysulfide polymer based adhesive compositions and more particularly to novel processes and compositions of matter obtained by the use of a polysulfide polymer containing organo-silane terminal groups in a primer composition or as an adhesion additive for high sulfur rank polysulfide polymer based adhesive compositions.

Primer compositions and adhesion additives have become important in improving the adhesion of adhesive compositions. Various attempts to find a suitable adhesion additive for the high sulfur rank liquid polysulfide polymer based sealants have been made. However, up to the time of this invention, these efforts have met in failure. In fact, it was found that many compounds which had met with success as adhesion additives for low sulfur rank liquor polysulfide polymer based adhesive compositions gave poor results or completely failed as adhesion additives for the high sulfur rank polysulfide based adhesive compositions.

Therefore, it is an object of this invention to provide novel adhesion additives and primer compositions for high sulfur rank polysulfide polymer based adhesive compositions.

It is a further object to provide novel adhesion additives and primer compositions which will result in improved adhesion of high sulfur rank polysulfide based adhesive compositions to various substrates.

A still further object of this invention is to provide novel processes for adhesively bonding high sulfur rank polysulfide based adhesive compositions to various substrates.

A yet further object is to provide articles of manufacture by bonding together various substrates by means of high sulfur rank polysulfide polymer based adhesive compositions.

These and yet further objects are accomplished by the use of an organo-oxysilane terminated polysulfide polymer as (1) an adhesive additive or as (2) a primer composition for a high sulfur rank polysulfide polymer based sealant composition.

The organo-silane terminated polysulfide polymers of this invention are those described in South African Patent S.N. 64/3621 and in U.S. Ser. No. 517,953 filed January 3, 1966, now abandoned, in the name of R. H. Gobran. These organo-silane terminated polymers are produced by (1) the reaction of an organo-silane compound containing an ethylenically unsaturated group with an —SH group containing polysulfide polymer, and (2) the reaction of a —Cl group containing organo-silane compound with an —SNa group containing polysulfide polymer, and (3) the reaction of an epoxy group containing organo-silane compound with an —SH group containing polysulfide polymer.

The organo-silane-modified polysulfide polymers as a whole may be represented by the general formula:

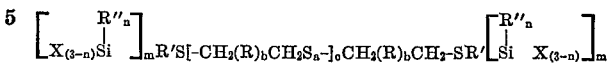

wherein $a$ is 2, 3 or 4, $b$ is 0 or 1, R is a divalent radical free from aliphatic unsaturation, consisting of hydrocarbon radicals or radicals containing C, H and O and/or S in the form of radicals selected from $\equiv$C—O—C$\equiv$, —OH, —SH and $\equiv$C—S—C$\equiv$, $c$ is at least 1, R' is a multivalent hydrocarbon radical or a multivalent radical containing carbon, hydrogen and oxygen in the form of

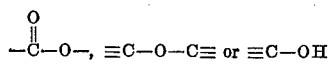

there being no acetylenic unsaturation in R', R" is a monovalent hydrocarbon radical or a monovalent halohydrocarbon radical, $n$ is 0, 1 or 2, X is a hydrolysable group and $m$ is an integer equal to one less than the valency of R'; there being an average of at least 2 Si atoms and 3 X groups in each molecule.

$c$ is an integer of a value of at least one. There is no critical value for $c$ but it is preferred that $c$ have a value of at least 5 and a particularly desirable range is when $c$ is from 5 to 100 inclusive.

R can be any divalent radical free from aliphatic unsaturation that is essentially hydrocarbon, alcohol, mercaptan, ether or thioether such as —CH$_2$—, —C$_{18}$H$_{36}$—,

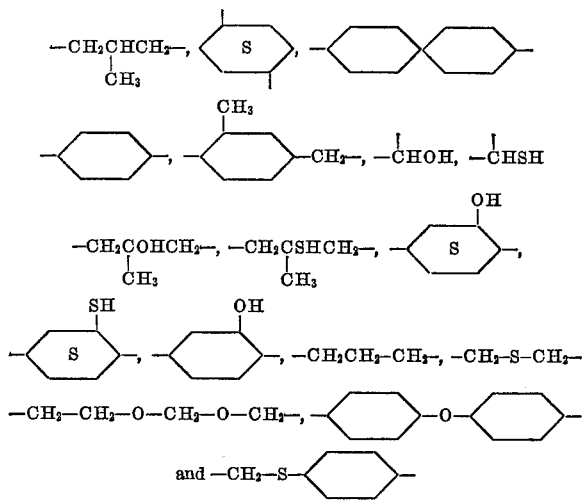

R' can be any multivalent radical that is hydrocarbon, ester, ether, or alcohol, all without acetylenic unsaturation such as

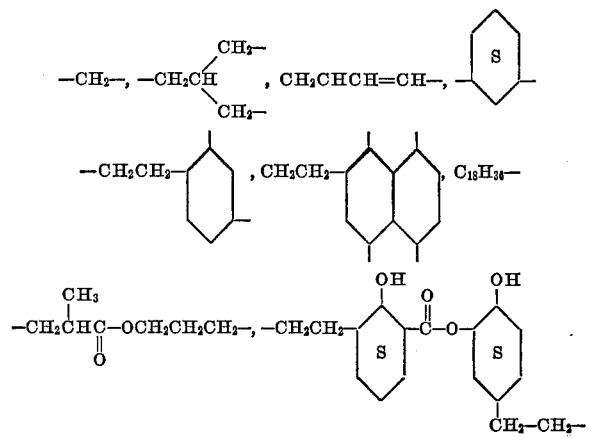

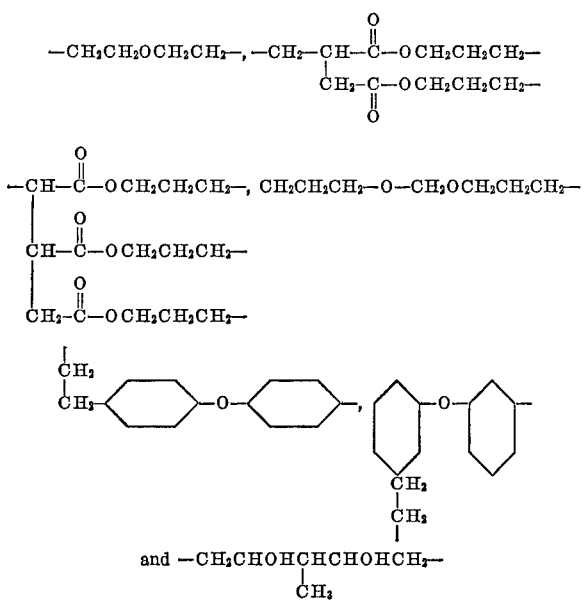

and —CH₂CHOHCHCHOHCH₂—
         |
         CH₃

R″ can be any monovalent hydrocarbon or halohydrocarbon radical such as —CH₃, —C₂H₅, —CH=CHCH₃,

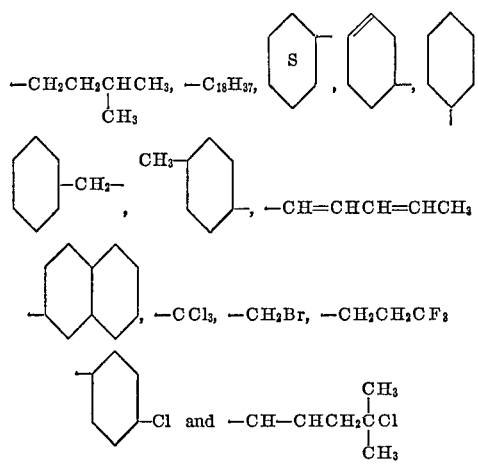

X can be any hydrolyzable group such as halogen atoms, inorganic radicals such as thiol, cyanide, thiocyanate, isocyanate, sulphate, and bisulphate.

The preferred X groups are acyloxy, alkoxy, and hydrocarbyl-substituted isocyanoxy

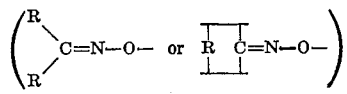

X can be a radical containing nitrogen such as amino, hydroxylamine, secondary or tertiary amino. It can be a radical containing phosphorus through phosphate radicals. It can also be an organic radical where the radical can be attached to the silicon atom through a linking oxygen, sulphur, or nitrogen atom. These radicals can be in the following forms:

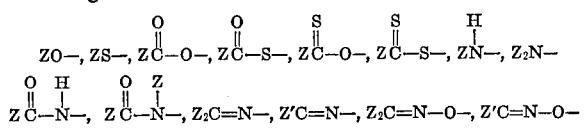

where Z is a monovalent hydrocarbon, hydrocarbon ether, or thioether radical, or a hydroxylated and/or halogenated derivative thereof, and Z′ is a divalent radical of the same description as Z.

Z can be, for example, alkyl such as methyl, ethyl, propyl, butyl, and octadecyl; alkenyl such as vinyl, allyl or methallyl; cycloalkyl such as cyclopentyl, cyclohexyl, or cyclohexenyl; aryl such as phenyl, xenyl and naphthyl; alkaryl such as tolyl and xylyl; aralkyl such as benzyl and 2-phenyl-propyl; hydrocarbon ether such as ethoxyethyl, butoxypropyl, phenoxybutyl and tolyloxyphenyl; a halogenated derivative such as trifluoroethyl, dibromocyclopentyl, chlorophenyl, trichlorotolyl, dichlorobenzyl, trifluoroethoxyethyl, and chlorophenoxyphenyl; and hydroxylated derivatives such as hydroxyethyl, hydroxyphenyl, hydroxycyclobutyl, hydroxyethoxyethyl and hydroxyphenoxypropyl.

Z′ can be

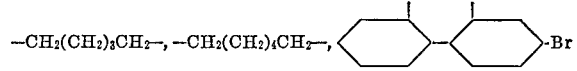
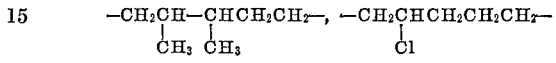
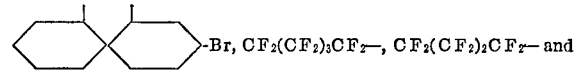

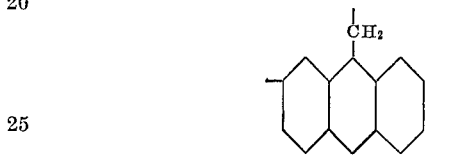

The polysulfide polymers which are suitable for preparing the organo-oxysilane polysulfides of this invention are the polysufide polymers disclosed in South African Patent S.N. 64/3621 and in U.S. Ser. No. 517,953, filed Jan. 3, 1966, now abandoned and include both low and high molecular weight, such as those disclosed in U.S. 2,466,963 and in U.S. 2,789,958; the high sulfur rank polysulfide polymers such as disclosed in copending application S.N. 290,637 filed June 26, 1963, now abandoned; hemiacetal or hemiketal blocked high sulfur rank polysulfide polymers such as those disclosed in copending application S.N. 302,724 filed Aug. 16, 1963, now abandoned.

The high sulfur rank polysulfide polymer based sealants which are the subject of this invention are those sealants based upon high sulfur rank polysulfide polymers such as those disclosed in copending application S.N. 290,637 filed June 26, 1963, now abandoned, or the hemiacetal or hemiketal blocked high rank polysulfide polymers (hereinafter, for convenience, referred to simply as "blocked high sulfur rank polysulfide polymers") such as those disclosed in copending application S.N. 302,724 filed August 16, 1963, now abandoned.

The high sulfur rank polysulfide polymers have an average sulfur rank of about 1.6 to 5.0 and also contain (—SSH) pendant groups or terminals, and contain at least some sulfur linkages between the recurring hydrocarbon, oxahydrocarbon or thiahydrocarbon radicals which contain more than two sulfur atoms. The high rank polysulfide polymers are formed by reacting the conventional liquid polysulfide polymers with elemental sulfur as is shown by the following reaction:

*HS(—RS$_r$)$_n$—RSH + ($n$p+2)S→
 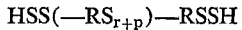
HSS(—RS$_{r+p}$)—RSSH

The unblocked high sulfur rank polysulfide polymers cure at room temperature without the need of a separate cure catalyst. However, the blocked high sulfur rank polymers are generally cured by means of the conventional low sulfur rank polysulfide polymer curing agents such as organic and metal peroxides.

The high sulfur rank liquid polysulfide polymers described above are formulated to form suitable sealant

---

\* It is understood that these polymers may also contain cross-linking or branching or other such variations, wherein the average of $r$ is 1.5 to 2.0, $p$ is 0.1 to 3.0, $n$ is 2 to 70, and $r+p$ may be 1 to 5 (the sulfur rank of a particular polymer chain), and at least one ($r+p$) per polymer chain is equal to 2 to 5, and the average ($r+p$) (average sulfur rank of all polymer chains) is about 1.6 to 5.0. R is a hydrocarbon, oxahydrocarbon, thiahydrocarbon radical, and other groups which do not interfere with the reaction.

compositions by convention methods such as described in copending application S.N. 290,637 filed June 26, 1963, now abandoned. Such adhesive compositions may also contain various types of inert materials commonly used in polysulfide adhesive compositions such as reinforcing fillers, nonvolatile plasticizers; pigments; cure accelerators; cure inhibitors such as stearic acid; perfumes; ultraviolet light stabilizers and the like.

The adhesive additives and primer compositions of this invention have been found to be especially useful for increasing the adhesion of high sulfur rank polysulfide polymer based adhesive compositions to metal and siliceous subtrates, such as aluminum and glass.

The following examples are given merely to illustrate this invention and are not intended as a limitation upon the scope thereof.

EXAMPLE 1

Vinyl triethoxy silane polysulfide was formed as described in copending application S.N. 517,953 filed Jan. 3, 1966, now abandoned, by charging into a reactor 200 grams of a polysulfide polymer having essentially the structure

with about 2% crosslinking, a molecular weight of about 4000, and a sulfur rank of 2.0; and 40 grams of vinyl triethoxy silane. The reactor and its contents under a moisture-free atmosphere was then heated to a maximum temperature of 110° C., followed by the slow addition of 5 grams of 2,2′-azobisisobutyronitrile. The reaction was considered to be complete when the evolution of nitrogen gas bubbles had ceased. The product, vinyl triethoxy silane polysulfide, was a liquid polymer at room temperature and had an —SH group content of about 1% by weight.

EXAMPLE 2

A liquid polysulfide polymer (hereinafter called LP-32 polysulfide polymer) is prepared having a sulfur rank of 2.0, 0.5% cross linking, essentially the structure

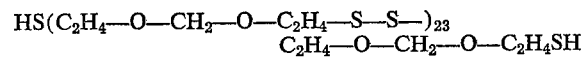

and a molecular weight of 4000. This polysulfide polymer is then reacted with paraformaldehyde in the presence of triethylamine to block the —SH groups present on the polymer chain. 200 grams of this blocked polysulfide polymer, 58 grams of elemental sulfur, 2 cc. of n-dibutylamine, and ½ cc. of H₂O are then charged into a reactor. The reaction is carried out under an atmosphere of nitrogen with continuous agitation at a temperature of 23–53° C. for 3 hours. The resulting high sulfur rank liquid polysulfide polymer has a sulfur rank of 3.5 and a viscosity of 330 poises.

EXAMPLE 3

A high rank polysulfide polymer based sealant was made up according to the following formulation:

Sealant formulation

| | Parts by weight |
|---|---|
| High sulfur rank polysulfide polymer of Example 2 | 100 |
| SRF, carbon black (filler) | 10 |
| Witcarb RC calcium carbonate (filler) | 30 |
| Methyl ethyl ketone (plasticizer) | 16 |
| Stearic acid (cure retarder) | 1 |
| Vinyl triethoxy silane polysulfide of Example 2 | 5 |

Curing paste:

| | |
|---|---|
| Lead peroxide, PbO₂ | 7.5 |
| Aroclor 1254, a chlorinated biphenyl (plasticizer) | 7.5 |

The above ingredients were compounded on a paint mill using conventional procedures. Beads of the sealant formulation were placed upon substrates of glass and aluminum.

The sealant composition was tested for adhesion to the substrates about one week after being applied to the substrates. The adhesion test consisted of attempting to peel a cured bead of the sealant composition from the substrate. The cured bead comprises a cloth peel strip 1″ x 2″ covered with sealant composition ⅟₃₂″ in depth on both sides so as to make a uniform cured bead 1″ x 2″ x ⅟₁₆″, when placed on the substrate. The strip is peeled back 180° at one end of the bead and an Instron Tensile Tester produced by Instron Engineering Corp. of Canton, Mass., is attached to the peeled back end and a crosshead speed of 2″/min. is applied to produce a uniform pull on the cured bead. The test was conducted similarly to ASTM-D903. If the bead peeled off the substrate easily without causing a rupture in the structure of the bead, this fact was noted as an "adhesive failure." If the bead ruptured or tore apart rather than pulling off the substrate, this fact was noted as a "cohesive failure." Borderline instances are denoted as "adhesive-cohesive," or "slight adhesive failures." The test was conducted at a room temperature of 84° F. and a relative humidity of 70%.

The results were as follows:

1 week at room temperature

| | |
|---|---|
| Glass | 32C |
| Aluminum | 30C |

1 week in water at room temperature

| | |
|---|---|
| Glass | 36C |
| Aluminum | 28C |

C=Cohesive failure.

EXAMPLES 4–9

High sulfur rank polysulfide based sealants were prepared according to the following formulations, expressed in parts by weight:

| Example | 4 | 5 | 6 | 7 | 8 | 9 |
|---|---|---|---|---|---|---|
| High sulfur rank polysulfide polymer of Example 2 | 100 | 100 | 100 | 100 | 100 | 100 |
| SRF (carbon black filler) | 10 | 10 | 10 | 10 | 10 | 10 |
| Witcarb RC (CaCO₃ filler) | 30 | 30 | 30 | 30 | 30 | 30 |
| Aroclor 2154 (chlorinated biphenyl plasticizer) | 5 | 5 | 5 | 5 | 5 | 5 |
| Methyl ethyl ketone (plasticizer) | 13 | 13 | 13 | 13 | 13 | 13 |
| Stearic acid (cure retarder) | 1 | 1 | 1 | 1 | 1 | 1 |
| Curing paste: | | | | | | |
| Lead peroxide (PbO₂) | 7.5 | 7.5 | 7.5 | 7.5 | 7.5 | 7.5 |
| Aroclor 1254 (chlorinated biphenyl plasticizer) | 7.5 | 7.5 | 7.5 | 7.5 | 7.5 | 7.5 |
| Vinyl Triethoxy silane polysulfide of Example 1 | 5 | | | | | |
| Phenolic Adhesion Additive | | 5 | | | | |
| 3/3 mixture of phenolic adhesive additive/polyepoxide [1] | | | 6 | | | |
| 3/3 mixture of phenolic adhesive additive/polyepoxide [2] | | | | 6 | | |
| 3/3 mixture of phenolic adhesive additive/gamma glycidoxypropyl trimethoxy silane | | | | | 6 | |
| 3/3 mixture of phenolic adhesive additive/toluene diisocyanate | | | | | | 6 |

[1] Bisphenol A/epichlorohydrin polyepoxide having an epoxy equivalence of 450–525.
[2] Bisphenol A/epichlorohydrin polyepoxide having an epoxy equivalence of 175–210.

The sealant compositions of Examples 4–9 were each applied to a glass and an aluminum substrate. The sealants were then allowed to cure at room temperature for a one week period. Thereafter the sealant compositions were tested for adhesion to these substrates. The sealants of Examples 4–9 when tested for adhesion as in Example 3 gave the following results:

|  | 1 week (at room temp.) after application of sealant to substrate | | | | |
|---|---|---|---|---|---|
| Example | 4 | 5 | 6 | 7 | 8 | 9 |
| Substrate: | | | | | | |
| Glass | C[1] | A[2] | A | A | A | A |
| Aluminum | C | A | A | A | A | A |
|  | 1 week exposed to air at room temperature plus 1 week under water at room temperature | | | | | |
| Substrate: | | | | | | |
| Glass | C | A | A | A | A | A |
| Aluminum | C | A | A | A | A | A |

[1] C=cohesive failure.
[2] A=adhesive failure.

EXAMPLE 10

A primer composition was prepared by mixing together 10 parts by weight of vinyl triethoxy silane polysulfide prepared as in Example 1 and 90 parts by weight of toluene. A sealant composition of the following formulation was prepared:

| | Parts by weight |
|---|---|
| High sulfur rank polysulfide polymer of Example 2 | 100 |
| SRF, carbon black (filler) | 10 |
| Methyl ethyl ketone (plasticizer) | 16 |
| Curing paste: | |
| Lead peroxide, $PbO_2$ | 7.5 |
| Aroclor 1254, a chlorinated biphenyl containing 54% chlorine | 7.5 |

The primer composition was then applied to glass and aluminum substrates. The sealant formulation was then applied in beads to these primed substrates, as well as to unprimed substrates as controls. The test substrates were kept at room temperature for 1 week. At the end of this time the sealant beads were tested for adhesion by the method described in Example 3. The results were as follows:

|  | Unprimed | Primed |
|---|---|---|
| Substrate: | | |
| Glass | A[1] | C[2] |
| Aluminum | A | C–A |

[1] A=adhesive failure.
[2] C=cohesive failure.

I claim:

1. In an adhesive composition comprising a major amount of a liquid high rank polythiopolymercaptan polymer having in its polymeric chain recurring radicals selected from the group consisting of hydrocarbon and oxahydrocarbon radicals linked by sulfur linkages wherein at least some of said sulfur linkages contain more than two sulfur atoms and the average sulfur rank of all said linkages is about 1.6 to 5.0 and wherein the mercaptan terminals may be blocked with hemiacetal or hemiketal groups, the improvement comprising a minor amount of an adhesive additive incorporated therein, said adhesive additive being an organosilane-modified polysulfide polymer having the general structure:

$$\left[ X_{(3-n)} \overset{R''_n}{\underset{|}{Si}} \right]_m R'S[-CH_2(R)_bCH_2S_a-]_cCH_2(R)_bCH_2SR'-\left[ \overset{R''_n}{\underset{|}{Si}} X_{(3n)} \right]_m$$

wherein

R is a divalent radical, free from aliphatic unsaturation, containing C and H, in which divalent radical any remaining atoms are selected from the group consisting of O and S in the form of radicals of the group consisting of $\equiv C-O-C\equiv$, $-OH$, $-SH$, and $\equiv C-S-C\equiv$;

R' is a multivalent radical, free from acetylenic unsaturation, containing carbon and hydrogen, any other atoms in the radical consisting of oxygen in the form selected from the group consisting of $$-\overset{O}{\underset{\|}{C}}-O-, \quad \equiv C-O-C\equiv \text{ and } \equiv C-OH$$

R'' is a monovalent radical selected from the group consisting of hydrocarbon and halohydrocarbon;
X is a hydrolyzable group;
a is an integer of a value of 2 through 4;
b is an integer of a value of 0 through 1;
c is an integer of a value of at least 1;
m is an integer equal to one less than the valence of R'; and
n is an integer of a value of 0 through 2, there being an average of at least 2 Si atoms and 3 X groups in each molecule.

2. The adhesive composition as in claim 1 wherein X is alkoxy.

3. The adhesive composition as in claim 1 wherein R is $-CH_2OCH_2OCH_2-$.

4. The adhesive composition as in claim 2 wherein n is 0.

5. In an article of manufacture comprising a substrate selected from the group consisting of a siliceous substrate and a metal substrate and a body of high rank polythiopolymercaptan polymer based adhesive composition cured in situ against and bonded to said substrate, the improvement comprising an organosilane-modified polysulfide polymer at least at the interface between the surface of said structure and said body of high rank polysulfide polymer, said organosilane-modified polysulfide polymer and said high rank polythiopolymercaptan polymer having the structure as given in claim 1.

6. The article of manufacture as in claim 5 wherein X is alkoxy.

7. The article of manufacture as in claim 5 wherein R is $-CH_2OCH_2OCH_2-$.

8. The article of manufacture as in claim 6 wherein n is 0.

9. The article of manufacture as in claim 5 wherein said substrate is selected from the group consisting of aluminum and glass substrates.

10. In a process of adhesively bonding a substrate selected from the group consisting of a metallic substrate and a siliceous substrate to a high rank polythiopolymercaptan polymer based adhesive composition the improvement comprising incorporating in said high rank polythiopolymercaptan polymer based adhesive composition a minor amount of an organosilane-modified polysulfide polymer having the structure as given in claim 1 and wherein the high rank polythiopolymercaptan polymer has the structure as given in claim 1.

11. The process as in claim 10 wherein X is alkoxy.

12. The process as in claim 10 wherein R is $$-CH_2OCH_2OCH_2-$$

13. The process as in claim 11 wherein n is 0.

14. In a process of adhesively bonding a substrate selected from the group consisting of a metallic substrate and a siliceous substrate to a high rank polysulfide polymer based adhesive composition, the improvement comprising first applying to said substrate a primer composition comprising an organosilane-modified polysulfide polymer having the structure as given in claim 1.

15. The process as in claim 14 wherein said primer composition contains an inert organic solvent.

16. The process as in claim 14 where X is alkoxy.
17. The process as in claim 14 wherein R is

—CH$_2$OCH$_2$OCH$_2$—

18. The process as in claim 16 wherein $n$ is 0.

References Cited

UNITED STATES PATENTS

| | | | |
|---|---|---|---|
| 3,123,495 | 3/1964 | Carpenter | 260—824 |
| 3,186,965 | 6/1965 | Plueddemann | 260—824 |
| 3,297,473 | 1/1967 | Bulbenko | 260—824 |
| 3,317,461 | 6/1967 | Plueddemann | 260—824 |
| 3,331,818 | 7/1967 | Bertozzi | 260—79.1 |

MURRAY TILLMAN, Primary Examiner

P. LIEBERMAN, Assistant Examiner

U.S. Cl. X.R.

117—124, 132, 135.1, 161; 260—18, 32.8, 33.6, 37, 46.5, 77.5, 79.1, 826